May 26, 1953
R. N. KELLY
2,639,571
SPREADING ATTACHMENT FOR LAWN MOWERS
Filed Dec. 10, 1949
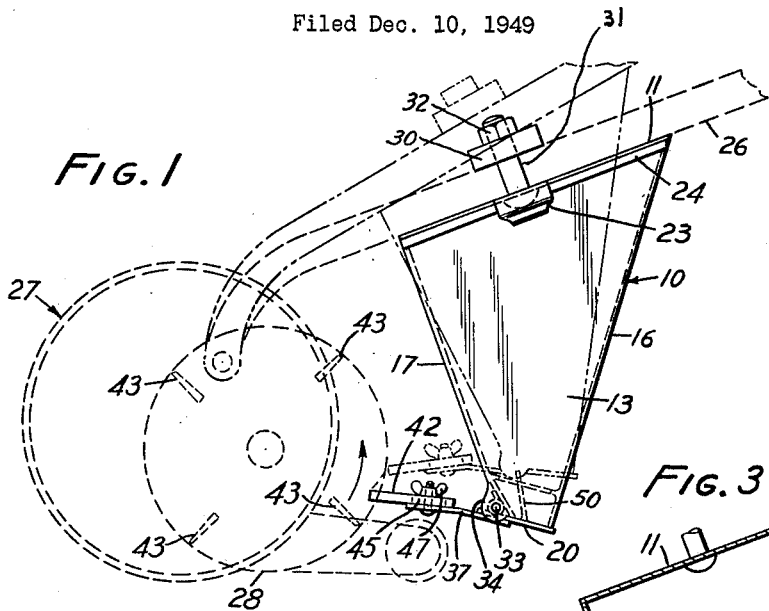
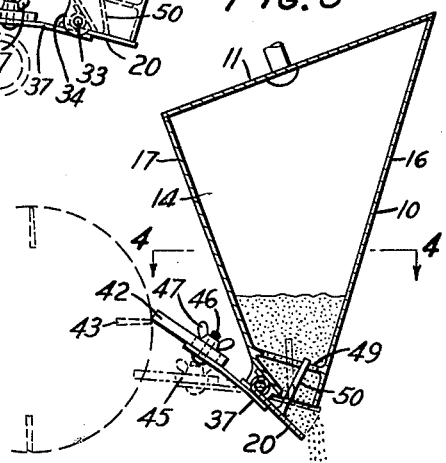
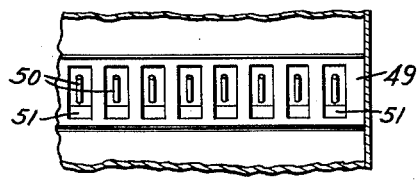
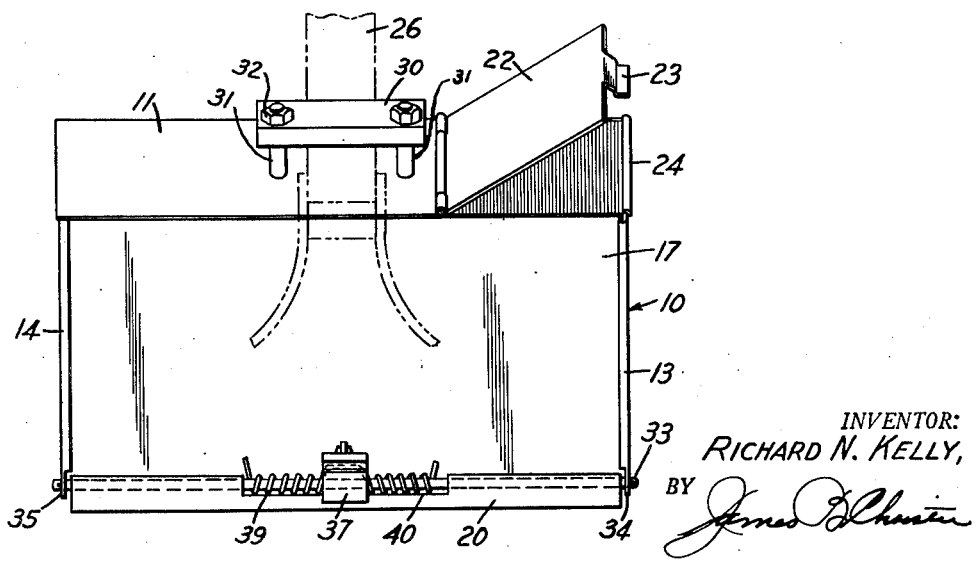
INVENTOR:
RICHARD N. KELLY,
BY
ATTORNEY.

Patented May 26, 1953

2,639,571

UNITED STATES PATENT OFFICE 2,639,571

SPREADING ATTACHMENT FOR LAWN MOWERS

Richard N. Kelly, Anaconda, Mont.; Edna Mae Kelly, administratrix of said Richard N. Kelly, deceased Application December 10, 1949, Serial No. 132,307

3 Claims. (Cl. 56—249)

This invention relates to a seed and fertilizer spreading attachment for a lawn mower.

Generally speaking, the apparatus of my invention comprises a hopper adapted for mounting on the handle of a conventional lawn mower having a rotatable cutter assembly with several blades. The attachment is adapted for use with the mower in its normal cutting position. The seed or fertilizer, carried by the hopper, escapes through a hinged discharge door. An arm is mounted on the door and so positioned with respect to the cutter assembly that the blades of the assembly periodically engage the arm which in turn swings the door open. The door is normally closed, for example by spring or other loading.

In my preferred embodiment, the hopper is suspended from the handle of the mower behind the cutter assembly. The contents of the hopper are supported above the discharge door by a grate having several openings or slots. A plurality of agitator pins affixed to the inner side of the door and extending through the slots of the grate, slide back and forth in the slots as the door flaps open and shut each time the arm is struck by a cutter blade. The hopper discharge door is spring loaded to the closed position. The end of the arm adjacent the cutter assembly carries an adjustable contact member or block which bears successively upon the blades of the cutter assembly.

The spreader of my invention is readily attached to most makes of lawn mowers and easily adjusted relative to the cutter assemblies thereof. Grass cutting and fertilizing are carried on simultaneously, a distinct advantage as the mower clearly marks the area covered. Formerly, especially when applying seed or fine fertilizer to a lawn it was difficult to ascertain what portion of the lawn had been covered. Hence, oftentimes one area would receive too large an application and another area too little.

The apparatus works equally well as a grass seeder or as a dispenser of fertilizer. The seed and the fertilizer fall behind the cutter blades, so that uncontrolled scattering due to contact with the blades, is avoided.

The design and operation of the attachment insures uniform application of fertilizer or seed. The flow of material is always under the control of the operator. When the handle of the lawn mower is raised to its full upright position, the blades of the cutter assembly no longer come in contact with and actuate the arm, and consequently the door of the hopper will remain closed.

If it is desirable to interrupt flow of the material from the hopper at any time, for example if a rock should lodge between a blade of the cutter assembly and the cutter bar, the flow is halted by simply raising the handle to its full upright position.

Operation of the mower with the handle at its lowest position gives the heaviest application of fertilizer or seed; operation at an intermediate height, an intermediate application. Thus, the operator by manipulation of the handle of the mower controls the quantity of the feed. This feature is especially useful when fertilizing an uneven lawn, needing varying amounts of fertilizer.

To use the lawn mower solely as a grass cutter, it is not necessary to remove the spreader attachment. The contact block is simply slid rearward out of contact with the cutter assembly.

By attaching the spreader to the mower, costly wheels and axles are eliminated. An apparatus of my design lends itself to mass manufacturing and gives a durable, inexpensive spreader that is adaptable to either fertilizing or seeding and may be used with most any make of lawn mower.

Fig. 1 is a side elevation of a presently preferred embodiment of my invention attached to a conventional lawn mower, shown in dotted lines.

Fig. 2 is a front elevation of the apparatus of Fig. 1 with only the handle and part of the forks of the mower shown.

Fig. 3 is a longitudinal section of the hopper of the apparatus of Fig. 1 with the hopper door shown in both an open and closed position.

Fig. 4 is a fragmentary plan view of the interior of the hopper.

Referring to Figs. 1, 2, and 3, it will be observed that the fertilizer spreader attachment includes a hopper 10, having a forwardly sloping top 11 and a pair of vertical side walls 13, 14. A rear wall 16 and a front wall 17 converge downwardly to a bottom door 20. A cover 22, forming a part of the top and transversely hinged thereon, is held in a closed position by a snap lock projection 23, sprung over the beaded upper edge 24 of the side wall 13.

The attachment is suspended from a handle 26 of a conventional lawn mower 27 rearward of a cutter assembly 28. A cleat 30, bearing on the upper surface of the handle and detachably fastened to the hopper by a pair of bolts 31 and nuts 32, holds the attachment in position.

The door is hinged at the bottom front of the hopper by a rod 33 which is rotatably mounted in ear shaped projections 34, 35 of the side walls. The door is actuated by a paddle arm or lever 37 welded to the under central surface of the door, and is normally held in a closed position by a pair of coil springs 39, 40, coaxial with the hinge rod and disposed on either side of the arm. The door slopes downwardly from its hinge to the lower end of the rear wall.

The paddle arm extends forward to a point adjacent the cutter assembly. The forward end of the arm supports on its upper surface an adjustable contact block 42. The block, if sufficiently extended, comes in contact with each of the blades 43 of the cutter assembly as the latter rotates. The block has a longitudinal slot 45 which permits forward-to-rear adjustments and is held to the arm by a bolt 46 and a thumb nut 47. The block is preferably constructed of wood or other suitable material which will not damage the blades of the cutter assembly.

A grate 49 spaced above and parallel to the hinged door in its closed position supports the contents of the hopper. A plurality of agitator pins 50 (see Figs. 3, 4) affixed to the inner side of the door extend upwardly through slots 51 in the grate such a distance that they remain within their respective slots regardless of the swinging of the door. These pins prevent clogging of the grate openings.

The spreader is readily adapted for attachment to mowers of different makes. The major adjustment is the cleat which is used for positioning the hopper on the handle; this adjustment is used primarily to adapt the spreader attachment for use with different makes of lawn mowers. Movement of the contact block permits adjustment of the arm with respect to the blades of the cutter assembly. Forward adjustment of the contact block increases the rate of flow; rearward adjustment decreases it.

With the forward end of the contact block in the path of rotation of the cutter assembly, forward motion of the mower results in periodic opening of the hopper door against the action of the springs. The contact block successively engages each blade of the cutter assembly. For each revolution of the cutter assembly, the door of the hopper will open a number of times equal to the number of blades carried by the assembly.

The contact block will move out of engagement with the cutter assembly when the mower handle is raised to its full upright position (see Fig. 1) if the hopper is properly positioned along the handle and the block correctly adjusted. This is so because the forks of the handle of the mower are pivoted above the center line of the cutter assembly. With the lowering of the handle from its full upright position, the block will once again contact the cutter assembly. Further lowering of the mower handle increases the "bite" or engagement time of the cutter block with each blade, thereby holding the hopper door open longer. Thus, the operator by raising or lowering the mower handle may regulate the flow. Longitudinal adjustment of the contact block likewise affects the amount of material flow from the hopper.

Should the cutter assembly lock at a time when the hopper door is open, the operator by raising the handle can disengage the contact block, and the door will close under the force of the springs. When forward motion of the mower ceases, the spring tension on the arm quickly stops the free revolving blades, thus preventing overseeding or overfertilizing of the area beneath the non-moving mower.

The gravitational feed of the hopper and the several agitator arms extending upwardly through the openings of the grate insure positive action and regular flow of the fertilizer or seed to the hopper door.

With the completely enclosed hopper the lawn mower can be inverted and rolled away without spilling the contents of the hopper.

I claim:

1. In a spreader attachment for use with a mower having a cutter assembly with a plurality of blades and a handle, the combination comprising a hopper, means for supporting the hopper from the handle rearward of the cutter assembly with the mower in its normal cutting position, a door spring-loaded to the closed position at the bottom of the hopper, an arm affixed at one end to the door, the arm being so disposed in relation to the cutter assembly that the blades of said assembly periodically strike the other end of the arm, thereby moving the door into an open position, a slotted grate in the hopper spaced above the door for supporting the material, and a plurality of agitator pins attached to the door and movable therewith and extending upwardly through the grate and movable in its slots.

2. In a spreader attachment for use with a mower having a cutter assembly with a plurality of blades and a handle, the combination comprising a hopper, means for detachably suspending the hopper from the handle rearward of the cutter assembly with the mower in its normal cutting position, a hinged door spring-loaded to the closed position at the bottom of the hopper, an arm affixed at one end to the door, the other end of the arm being disposed adjacent the cutter assembly, a contact member adjustably mounted to said other end of the arm and adapted to be disposed with respect to the cutter assembly so that the blades periodically engage the member and thereby move the door to an open position, a grate in the hopper spaced above the door for supporting the material, and a plurality of agitator pins attached to the door and movable therewith and extending upwardly through the grate.

3. In a spreader for use with a lawn mower having a wheeled carriage, a rotatable cutter suspended in the carriage and a handle pivotally mounted to the carriage, the combination comprising a hopper, means for detachably suspending the hopper from said handle with the mower in its normal cutting position, a door hinged to the bottom of the hopper and spring-loaded in the closed position, an arm affixed at one end to the door and extending toward the cutter, a contact member mounted on the other end of the arm and adjustable thereon in the direction of extension of the arm, the arm and contact member being of such length that the contact member may be positioned in the path of the rotatable cutter whereby the cutter strikes the contact member as it rotates, and the contact member may be removed from the path of the cutter by pivoting said handle upwardly with respect to said carriage.

RICHARD N. KELLY.

References Cited in the file of this patent

UNITED STATES PATENTS

| Number | Name | Date |
| --- | --- | --- |
| 44,241 | Vanstrum et al. | Sept. 13, 1864 |
| 165,198 | Balentine | July 6, 1875 |
| 660,600 | Taplin | Oct. 30, 1900 |
| 823,398 | Cudd | June 12, 1906 |
| 977,290 | Frennet | Nov. 29, 1910 |
| 2,242,710 | Loomis | May 20, 1941 |
| 2,320,387 | Schroeder | June 1, 1943 |